United States Patent
Fukuda et al.

(10) Patent No.: US 7,666,306 B2
(45) Date of Patent: Feb. 23, 2010

(54) ADSORBENT, METHOD FOR PRODUCING SAME, AND METHOD FOR PROCESSING OIL-CONTAINING WASTE WATER

(75) Inventors: Nobuo Fukuda, Yamaguchi (JP); Sadao Hayata, Yamaguchi (JP); Takashi Oyama, Yamaguchi (JP); Akira Ino, Yamaguchi (JP)

(73) Assignee: Nippon Petroleum Refining Co., Ltd., Tokyo (JP)

( * ) Notice: Subject to any disclaimer, the term of this patent is extended or adjusted under 35 U.S.C. 154(b) by 47 days.

(21) Appl. No.: 11/662,942

(22) PCT Filed: Sep. 6, 2005

(86) PCT No.: PCT/JP2005/016317
§ 371 (c)(1), (2), (4) Date: Oct. 17, 2007

(87) PCT Pub. No.: WO2006/030668
PCT Pub. Date: Mar. 23, 2006

(65) Prior Publication Data
US 2008/0210637 A1 Sep. 4, 2008

(30) Foreign Application Priority Data
Sep. 17, 2004 (JP) .............................. 2004-272357

(51) Int. Cl.
*C02F 1/42* (2006.01)

(52) U.S. Cl. ........................ 210/660; 210/691; 210/692; 210/693; 210/694; 502/416; 502/418

(58) Field of Classification Search .................. 210/660, 210/691–694; 502/416, 418
See application file for complete search history.

(56) References Cited

U.S. PATENT DOCUMENTS 6,194,344 B1 * 2/2001 Tsuchitani et al. .......... 502/174

FOREIGN PATENT DOCUMENTS

| EP | 0 124 065 | 7/1984 |
| EP | 0 282 053 | 9/1988 |
| JP | 55-56805 | 4/1980 |
| JP | 1-270576 | 10/1989 |

(Continued)

OTHER PUBLICATIONS

S. Ragan et al., "Effects of calcination upon properties of needle-cokes," *J. Mater. Sci.*, 18 (1983), pp. 3695-3704.

*Primary Examiner*—Chester T Barry
(74) *Attorney, Agent, or Firm*—Finnegan, Henderson, Farabow, Garrett & Dunner, LLP

(57) ABSTRACT

The present invention provides an adsorbent comprising calcined coke with a BET surface area of 20 $m^2/g$ or less which is obtained by calcining a particular carbonaceous material at 1000 to 1500° C. and which is preferably obtained by calcining coal coke, petroleum coke or charcoal coke at 1000 to 1500° C. The adsorbent of the present invention exhibits adequate adsorbent ability with respect to an oil component in oil-containing wastewater even when the oil-containing wastewater is an emulsion or contains a low concentration of the oil component, and also stably maintains the adsorbent ability over a long period of time.

4 Claims, 1 Drawing Sheet

FOREIGN PATENT DOCUMENTS

| | | |
|---|---|---|
| JP | 5-163491 | 6/1993 |
| JP | 7-136501 | 5/1995 |
| JP | 9-271759 | 10/1997 |
| JP | 2002-254072 | 9/2002 |
| JP | 2002-370023 | 12/2002 |
| JP | 2004-99348 | 4/2004 |
| SU | 1344738 | 10/1987 |
| WO | WO 01/10978 | 2/2001 |

* cited by examiner

ADSORBENT, METHOD FOR PRODUCING SAME, AND METHOD FOR PROCESSING OIL-CONTAINING WASTE WATER

TECHNICAL FIELD

The present invention relates to an adsorbent for use in treating oil-containing wastewater, to a manufacturing method therefor and to a method for treating oil-containing wastewater.

BACKGROUND ART

Industrial wastewater and household wastewater often contain an oil component. For example, oil-containing wastewater is discharged from various kinds of equipment at oil refineries. Vegetable oil manufacturing plants also discharge wastewater containing oil and fat in the course of producing soy bean oil, canola oil, corn oil and the like. Moreover, water-soluble cutting oil (mineral oil) is used to cool and lubricate cut surfaces at automobile manufacturing plants and many other manufacturing plants that use machine tools, and waste water containing this water-soluble mineral oil is sometimes discharged from these manufacturing plants. Wastewater containing relatively high concentrations of oil derived from animal and plant oil is also discharged by food processing plants, hotels, restaurants and the like. Consequently, the oil component needs to be removed when treating such oil-containing wastewater.

Conventionally, methods of removing the oil component from oil-containing wastewater have including methods in which the oil component is removed by adsorption using an adsorbent, and known adsorbents include porous materials such as activated carbon and activated coke (see for example Japanese Patent Application Laid-open No. 2002-254072).

DISCLOSURE OF THE INVENTION

Problem the Invention is to Solve

However, the activated carbon and activated coke used in conventional wastewater treatment are not always adequate as adsorbents for removing the oil component from oil-containing wastewater. That is, even if activated carbon and activated coke are relatively good at adsorbing oil itself, if the oil-containing wastewater is an emulsion they cannot adequately remove the oil component if it is present at a relatively low concentration in the oil-containing wastewater. Moreover, the ability of activated carbon and activated coke to adsorb oil components tends to decline relatively quickly, so there is also room for improvement from the standpoint of adsorbent life.

Under these circumstances is an object of the present invention to provide an adsorbent that exhibits adequate adsorbent ability with respect to an oil components in oil-containing wastewater even when the oil-containing wastewater is an emulsion or contains a low concentration of the oil component, and that stably maintains the adsorbent ability over a long period of time, along with a manufacturing method therefor. It is also an object of the present invention to provide a method for treating oil-containing wastewater whereby an oil component in wastewater can be removed stably over a long period of time.

Means for Solving the Problems

In the case of adsorbents consisting of porous materials such as activated carbon or activated coke, the size of the surface area based on the pore structure (normally 300 to 2500 $m^2/g$) is thought to contribute to adsorbent ability, but from our researches the inventors in this case have concluded that the pores do not function adequately for adsorbing an oil component in oil-containing wastewater. One reason for this may be that the particle size of an oil component in oil-containing wastewater is often larger than the pore diameter of activated carbon or activated coke. Moreover, the most common method of manufacturing activated carbon or activated coke is by activating coal or wood using steam or the like at 800 to 900° C., and the polar groups (carboxyl groups, phenolic hydroxyl groups, quinone carbonyl groups, etc.) formed on the surface of the activated carbon or activated coke by such activation treatment may also detract from its ability to adsorb oil components. That is, because the surface of a carbonaceous material is more reactive at the edge than at the base, these polar groups are likely to form around the pore inlets, and it is thought that when such polar groups are present around the pore inlets water molecules bind strongly the polar groups, impeding the entrance of oil components into the pores.

As a different approach from increasing surface area based on the pore structure, the inventors investigated techniques for improving ability to adsorb oil components by improving the surface properties of a carbonaceous material. As a result, the inventors succeeded in perfecting the present invention after discovering that an adsorbent with excellent ability to adsorb oil components could be obtained by calcining a particular carbonaceous material under specific temperature conditions so as to achieve a BET surface area within a specific range.

That is, the adsorbent of the present invention is an adsorbent for removing an oil component from oil-containing wastewater, and is obtained by calcining a particular carbonaceous material at 1000 to 1500° C.

The method for manufacturing the adsorbent of the present invention is a method of manufacturing an adsorbent for removing an oil component from oil-containing wastewater, comprising a calcination step of calcining a particular carbonaceous material at 1000 to 1500° C.

The method for treating oil-containing wastewater of the present invention is a method of removing an oil component from oil-containing wastewater by bringing the adsorbent of the present invention into contact with oil-containing wastewater so that the oil component in the oil-containing wastewater is adsorbed by the adsorbent.

The inventors have concluded that the excellent ability of the adsorbent of the present invention to adsorb oil components is attributable to the following.

That is, the term "calcination" is normally applied to drying treatment to remove volatile components and moisture contained in carbonaceous materials such as raw coke, but in the present invention it is thought that most of the polar groups on the surface of a carbonaceous material are removed by calcining the carbonaceous material at 1000 to 1500° C. The inventors have also concluded that the small quantity of polar groups remaining on the surface of the carbonaceous material contributes hydrophobia (lipophilia) to that surface sufficient to achieve a hydrophilia-hydrophobia balance that facilitates both water desorption and oil adsorption.

The adsorbent of the present invention preferably comprises calcined coke with a BET surface area of 20 $m^2/g$ or less obtained by calcining coal coke, petroleum coke or charcoal coke at a temperature of 1000 to 1500° C.

An adsorbent of the present invention exhibiting excellent ability to adsorb oil components from oil-containing wastewater can thus be achieved by composing an adsorbent of calcined coke obtained by calcining coal coke, petroleum coke or charcoal coke at 1000 to 1500° C.

Effects of the Invention

With the present invention it is possible to provide an adsorbent that exhibits adequate adsorbent ability with respect to an oil component in oil-containing wastewater even when such wastewater is an emulsion or contains a low concentration of the oil component, and that can stably maintain the adsorbent ability over a long period of time, along with a manufacturing method therefor. With the present invention it is also possible to provide a method for treating oil-containing wastewater capable of stably removing oil components from wastewater over a long period of time.

BEST MODE FOR CARRYING OUT THE INVENTION

Figure 1:
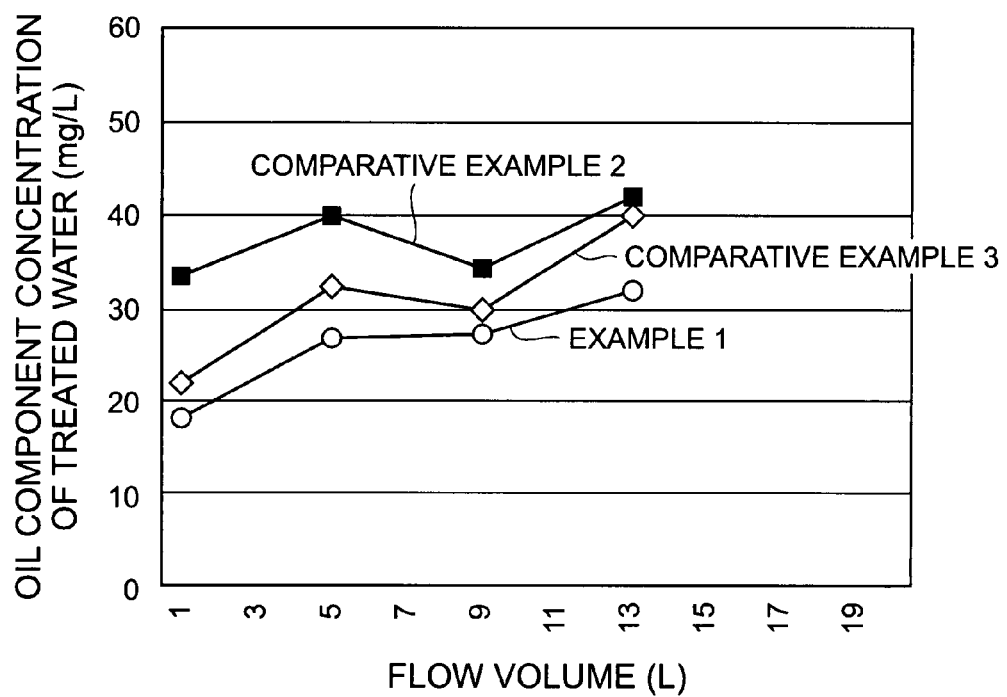
FIG. 1 is a graph showing the correlation between flow volume of oil-containing waste water and oil component concentration of treated water as obtained from an oil component adsorption test using the adsorbent of Example 1 and the adsorbents of Comparative Examples 1 and 2.

Desirable embodiments of the present invention are explained in detail below.

The adsorbent of the present invention is obtained by calcining a particular carbonaceous material at 1000 to 1500° C.

The carbonaceous material used as the raw material of the adsorbent is not particularly limited, but from the standpoint of contributing the surface properties of ease of water desorption and ease of oil adsorption to the resulting adsorbent, a non-porous material such as graphite (including expanded graphite) is preferred, and it is particularly desirable to use coke.

A porous material such as activated coke or activated carbon can be used as the carbonaceous material in the present invention, but these porous materials contain many polar groups (carboxyl groups, phenolic hydroxyl groups, quinone carbonyl groups, etc.) formed in the course of the activation treatment, making their surfaces highly hydrophilic. As a consequence, even after having been calcined at 1000 to 1500° C. activated coke and activated carbon retain many more polar groups on their surfaces than does coke, making it hard to contribute the desired hydrophobicity (lipophilicity) to the surface of the resulting adsorbent. Moreover, because the adsorbent ability of the adsorbent of the present invention derives from its surface properties, manufacturing costs are increased by using activated coke and activated carbon, which require an activation process to produce a specific internal structure (pore structure).

There are no particular limits on what kind of coke can be used favorably in the present invention, and examples include coal and petroleum cokes obtained from such raw materials as reduced crude, vacuum residual oil, tar sand, bitumen, shale oil, fluidized catalytic cracker residue and other heavy oils and coal tar, coal tar pitch and the like, as well as charcoal cokes obtained from such raw materials as wood, sawdust and coconut husks. One of these raw materials may be used alone or two or more may be used in combination. The coking processed used to manufacture the coke is also not particularly limited, and a fluid coking process, flexi-coking process, delayed coking process or the like can be applied. The heat-treatment temperature for the coking process is normally 400 to 600° C. Needle coke obtained through a delayed coking process is preferably used in the present invention.

The adsorbent of the present invention is obtained by calcining this carbonaceous material at 1000 to 1500° C. The calcination process can be performed using a rotary kiln or other horizontal calcining unit or a Riedhammer kiln, rotary hearth calciner or other vertical calcining unit or the like.

The processing temperature for calcination is 1000 to 1500° C. as mentioned above or preferably 1200 to 1450° C. or more preferably 1300 to 1400° C. If the processing temperature is less than 1000° C. not enough polar groups will be removed from the surface of the carbonaceous material, and it will be impossible to make the surface of the resulting adsorbent sufficiently hydrophobic. If the processing temperature exceeds 1500° C., too many polar groups may be removed from the surface of the carbonaceous material, and it will be difficult to achieve a hydrophilicity-hydrophobicity balance that facilitates water desorption and oil component adsorption at the surface of the adsorbent.

The atmosphere for calcination is not particularly limited as long as it allows polar groups to be removed from the surface of the carbonaceous material, but in the present invention the calcining process is preferably performed in air or in a nitrogen or other inactive gas atmosphere. When calcining in air, the atmosphere needs to be controlled so as to prevent an excess oxygen concentration in the kiln.

In order to make the calcining process more efficient, the rate of temperature increase up to the processing temperature is preferably 180 to 220° C./h. When cooling the calcined coke after the calcining process, the temperature near the outlet of the calcining unit (kiln or the like) is preferably 500° C. or less, and more preferably 300° C. or less so as to prevent oxidation of the calcined coke and control production of polar groups. The cooling method is not particularly limited and the coke may be left to cool naturally for example, but preferably it is forcibly cooled with water in order to further improve the process efficiency.

When coal coke, petroleum coke or charcoal coke for example for example is calcined at 1000 to 1500° C., the BET surface area of the resulting calcined coke is normally 20 $m^2/g$ or less or preferably 1 to 10 $m^2/g$. Thus, the calcined coke of the present invention has a smaller surface area than conventional activated carbon or activated coke. However, the researchers' studies have shown that an adsorbent consisting of such calcined coke has greater ability to adsorb an oil component in oil-containing wastewater than conventional activated carbon or activated coke. This comparison suggests that the absorbent ability of the adsorbent of the present invention derives from the improved surface properties obtained by calcination.

When the adsorbent of the present invention is composed of this calcined coke, the particle form is not particularly limited but is preferably a needle form. The mean particle size of the calcined coke is preferably 0.4 to 5 mm or more preferably 1 to 2 mm.

When calcined coke is manufactured for use as an electrode material or the like, the resulting calcined coke is normally sprayed with dedusting oil to prevent dust, but the manufacturing method of the present invention does not include such a dedusting oil treatment process. Therefore, the adsorbent of the present invention does not contain dedusting oil.

The resulting adsorbent of the present invention not only provides adequate ability to adsorb an oil component in oil-containing waste water even when the oil-containing wastewater is an emulsion or contains a low concentration of the oil component, but also stably maintains the adsorbent ability over a long period of time.

Next, the method for treating oil-containing wastewater of the present invention is explained.

In the method for treating oil-containing wastewater of the present invention, the aforementioned adsorbent of the present invention is brought into contact with oil-containing wastewater so that an oil component in the oil-containing wastewater is adsorbed by the adsorbent and thereby removed from the oil-containing wastewater.

There are no particular limits on the oil-containing wastewater to which this treatment method can be applied, and examples include oil-containing wastewater that is discharged from various equipment at oil refineries, waste water containing oil and fat that is discharged during the manufacture of soy bean oil, canola oil, corn oil and the like at vegetable oil manufacturing plants, wastewater containing water-soluble cutting oil (mineral oil) that is discharged from manufacturing plants that use machine tools, and wastewater containing animal and plant oil that is discharged from food processing plants and hotels, restaurants and the like. These oil-containing wastewaters may be emulsions.

The method of bringing the adsorbent of the present invention into contact with oil-containing wastewater is not particularly limited, and for example the adsorbent of the present invention can be packed into a treatment tank similar to conventional activated carbon adsorption tanks used to treat wastewater, and the oil-containing wastewater can then be passed through this treatment tank. In this case, the treatment conditions including the packed amount of the adsorbent the flow volume and the treatment temperature can be determined appropriately in light of the adsorbent ability of the adsorbent and the amount of oil contained in the wastewater. The flow of the wastewater may be either downward or upward, but a downward flow is preferred because it facilitates recovery of the adsorbent by reverse washing (upward flow).

When the adsorbent of the present invention is packed in a treatment tank and oil-containing wastewater is passed through it, another treatment means such as filtration, microbial treatment, coagulating sedimentation, chemical oxidation (ozone oxidation, etc.) or the like may be included in order to remove other substances such as suspended solids (SS), COD, BOD or the like contained in the oil-containing wastewater. In particular, when the oil-containing wastewater contains SS and other substances that can be adsorbed by carbonaceous materials, such SS are preferably removed by sand filtration or the like before the wastewater is brought into contact with the present invention. This is done because if wastewater containing SS is brought into contact as is with the adsorbent of the present invention, the SS may adversely affect the adsorbent ability of the adsorbent of the present invention.

When there is a large quantity of oil component, as much as possible of the oil component is preferably removed by an oil separation operation or the like before the wastewater is brought into contact with the adsorbent of the present invention. Conventional activated carbon and activated coke do not exhibit adequate ability to adsorb an oil component when the oil-containing wastewater is an emulsion or contains a low concentration of the oil component, but because the adsorbent of the present invention has good adsorbent properties even when the wastewater is an emulsion or contains a low concentration of an oil component, the oil component can be removed more efficiently and more precisely from the wastewater.

Another method of bringing the adsorbent of the present invention into contact with oil-containing wastewater is to place an oil-permeable bag filled with the adsorbent of the present invention into oil-containing wastewater.

An oil-permeable bag may be a sheet of paper or nonwoven fabric penetrated by multiple pores which is made into the form of a bag with an opening for example, and the adsorbent of the present invention can be packed into the bag and the opening sealed so that the adsorbent does not escape from the bag. The form of the bag is not particularly limited, and it can be in the shape of a mat or log.

Such a bag filled with the adsorbent of the present invention can be used not only in the treatment of oil-containing wastewater from oil refineries, factories and the like as discussed above, but also for pollution abatement such as the collection of oil effluent from water surfaces, and in the treatment of household waste oil.

EXAMPLES

The present invention is explained in more detail below based on examples and comparative examples, but the present invention is not in any way limited by these examples.

Example 1

Needle coke (S-JA calcined powder coke) was heated to 1300° C. at a rate of 3 to 4° C./minute in an atmosphere with the oxygen concentration controlled so as to prevent excess oxygen, and calcined for 4 hours at 1300° C. This was then forcibly cooled with water, and the outlet temperature of the calcining kiln was maintained at 120° C. to obtain calcined coke with a BET surface area of 3 $m^2/g$.

The resulting calcined coke was used in the following tests as the adsorbent of Example 1.

Example 2

Calcined coke with a BET surface area of 3 $m^2/g$ was obtained as in Example 1 except that the treatment temperature was 1000° C. during calcination of the needle coke, and used in the following tests as the adsorbent of Example 2.

Comparative Example 1

Calcined coke with a BET surface area of 4 $m^2/g$ was obtained as in Example 1 except that the treatment temperature was 800° C. during calcination of the needle coke, and used in the following tests as the adsorbent of Comparative Example 1.

Comparative Example 2

The needle coke used as the raw material in Example 1 (BET surface area 3 $m^2/g$) was used without calcination in the following tests as the adsorbent of Comparative Example 2.

Comparative Example 3

Activated carbon (Taiko activated carbon GM130 A, Futamura Chemical, BET surface area 1000 $m^2/g$) was used in the following tests as the adsorbent of Comparative Example 3.

[Oil Component Adsorbency Evaluation Test (1)]

The adsorbents of Examples 1 and 2 and Comparative Example 1 were subjected to the following test to evaluate their ability to adsorb an oil component in oil-containing wastewater. First, 100 mL of adsorbent was packed in a column (capacity 150 mL). Wastewater containing a fixed concentration of an oil component was passed through this column at a rate of 150 mL/minute, and the oil component concentration of the treated water coming out of the column was measured. The flow volume and oil component concentration of the oil-containing wastewater and the oil component concentration of the treated water are shown in Table 1.

TABLE 1

| Flow volume (L) | Oil component concentration (mg/L) | | | |
|---|---|---|---|---|
| | Oil-containing wastewater | Example 1 | Example 2 | Comparative Example 1 |
| 5 | 3.0 | 0.5 | 0.5 | 0.5 |
| 10 | 3.0 | 0.5 | 0.5 | 0.5 |
| 20 | 3.5 | 1.0 | 1.0 | 1.0 |
| 30 | 3.5 | 1.0 | 1.2 | 1.4 |
| 40 | 4.0 | 1.5 | 1.9 | 2.1 |
| 50 | 4.0 | 2.1 | 2.6 | 2.7 |

[Oil Component Adsorbency Evaluation Test (2)]

The adsorbents of Example 1 and Comparative Examples 2 and 3 were subjected to the following test to evaluate their ability to adsorb an oil component in oil-containing wastewater. First, 30 mL of adsorbent was packed in a column (capacity 100 mL). Oil-containing wastewater with an oil component concentration of 50 mg/L was then passed through this column at a rate of 60 mL/minute, and the oil component concentration of the treated water coming out of the column was measured. The correlation between flow volume of oil-containing wastewater and oil component concentration of the treated water is shown in FIG. 1.

[Lipophilicity and Hydrophilicity Evaluation Test]

100 mL of each of the adsorbents of Examples 1 and 2 and Comparative Examples 1 to 3 was placed in a separating funnel together with 100 mL of A heavy oil, agitated, and left to sit for 2 days. The A heavy oil was then dripped out, and the lipophilicity of the adsorbent was then evaluated based on the collected amount of A heavy oil. The results are shown in Table 2.

The same test was also performed using 100 mL of water instead of 100 mL of A heavy oil to evaluate the hydrophilicity of each adsorbent based on the collected amount of water. The results are shown in Table 2.

TABLE 2

| | | Ex. 1 | Ex. 2 | Comp. Ex. 1 | Comp. Ex. 2 | Comp. Ex. 3 |
|---|---|---|---|---|---|---|
| Lipophilicity | Collected amount of A heavy oil (mL) | 87 | 88 | 89 | 95 | 60 |
| Hydrophilicity | Collected amount of water (mL) | 94 | 94 | 94 | 94 | 92 |

As shown from the results above, the adsorbent of Examples 1 and 2 have smaller surface areas than the adsorbents of Comparative Examples 3, which use activated carbon, and have greater ability to adsorb an oil component in oil-containing wastewater even though their ability to adsorb A heavy oil by itself is lower.

The invention claimed is:

1. An adsorbent for removing an oil component from oil-containing wastewater, obtained by calcining a petroleum coke at 1000 to 1500° C., said petroleum coke having a BET surface area of 20 m$^2$/g or less, wherein said petroleum coke is obtained by coking a heavy oil at 400 to 600° C.

2. A method for manufacturing an adsorbent for removing an oil component from oil-containing wastewater, comprising:
    a coking step of coking a heavy oil at 400 to 600° C. to obtain a petroleum coke; and
    a calcination step of calcining said petroleum coke at 1000 to 1500° C. to obtain petroleum coke having a BET surface area of 20 m$^2$/g or less.

3. A method for treating oil-containing wastewater, wherein an adsorbent according to claim 1 is brought into contact with oil-containing wastewater so that the oil component in said oil-containing wastewater is adsorbed by said adsorbent and thereby removed from said oil-containing wastewater.

4. The method for treating oil-containing wastewater according to claim 3, wherein said absorbent having a BET surface area of 20 m$^2$/g or less.

* * * * *